March 8, 1932.    L. DUFAY    1,848,998
COLOR PHOTOGRAPHY
Filed March 8, 1929
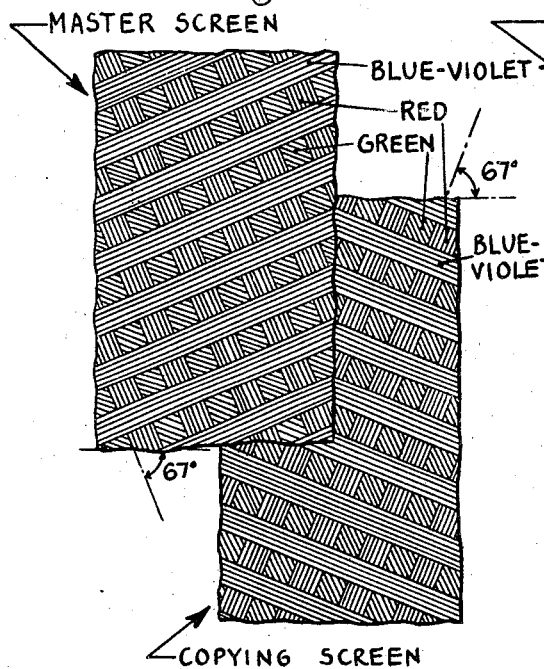
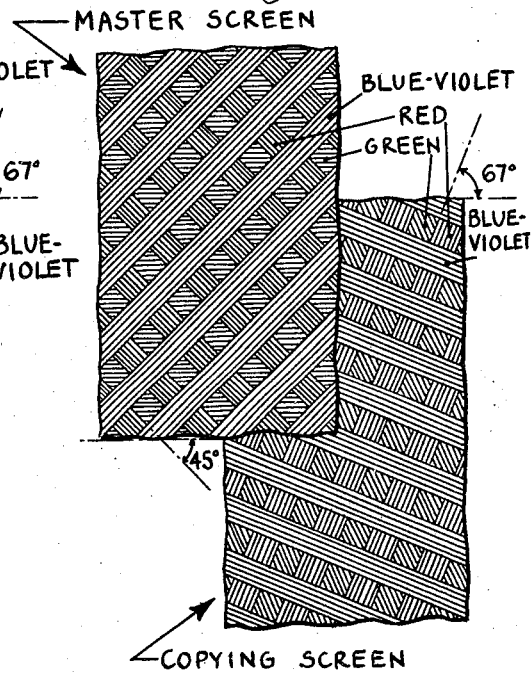
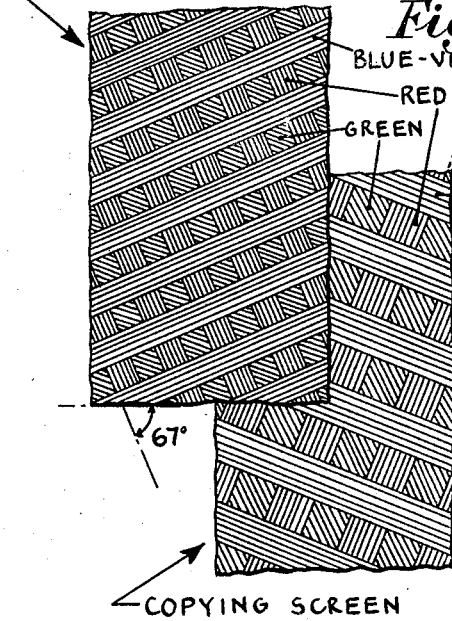
LENGTHWISE DIRECTION OF FILMS →

Patented Mar. 8, 1932

1,848,998

UNITED STATES PATENT OFFICE

LOUIS DUFAY, OF VERSAILLES, FRANCE, ASSIGNOR TO HAROLD WADE, OF LONDON, ENGLAND

COLOR PHOTOGRAPHY

Application filed March 8, 1929, Serial No. 345,605, and in Great Britain August 3, 1928.

This invention consists of improvements in or relating to color photography. One object is to enable a reproduced film (in natural colors), such as a positive, to be successfully produced from a master film, such as a negative; and another object is to enable multicolor screens to be produced on these films which are to be used respectively as master films and as reproduced films. The invention has particular reference to cinematography in natural colors.

The production of multicolor screens (and sensitized film embodying the same) for color photography is typified by the process described in my copending application, Serial No. 345,604, filed March 8, 1929, now matured into Letters Patent No. 1,805,361, granted May 12, 1931, in which there is applied to a dyed support fatty resists in the form of straight parallel lines. In processes of this type it is customary after one series of dyeing operations, to print on the support a second series of parallel lines consisting of fatty resists, such lines being at right angles to the first series.

If a master film and a film to be reproduced in natural colors by contact-printing from the master film, be both formed on films having identical multicolor screens (or having lines at the same angles), interference effects are set up, such as the moiré effect, and this prevents satisfactory printing.

According to this invention, a method of copying a multi-color screen master picture of the geometrical kind on a sensitive surface, having a multi-color screen of the same kind, consists of disposing the master picture and the receptive surface in a relative angular position, such that the corresponding lines of the patterns are at an angle to one another such that the moiré effect in the copy is absent.

In the accompanying drawings, Fig. 1 shows the master screen with the lines at an angle of 45° to the copying screen; Fig. 2 shows the lines of the master and copying screens at a different angle; and in Fig. 3 the mesh of the master screen differs in size from that of the copying screen.

In the case of cinematograph films, it is naturally impossible to give individual angular displacement to single pictures on a film, but the object of this invention may be achieved in various ways.

For example, according to this invention, the angle of the lines in the multi-color screen to the edges of the film in the master negative film may differ from the angle of the lines to the edge of the film in the reproduced or positive film.

For example, if the film receives two impressions of fatty resists in the form of straight lines, the first set of lines may be at an angle of 23° to the axial line of the cylinder, i. e. 67° to the edge of the film, and the second set of lines may be at right angles to the first set. However, when the printing operation takes place the films may be arranged face-to-face or back-to-back, and thus the corresponding lines in the multi-color screen will be at 45° to one another, and there will be no moiré effect. This is shown diagrammatically in Figure 1 in which the multi-color screens are shown separated from their respective films for the sake of clearness.

According to another method of carrying this invention into effect, the multicolor screen for one type of film (e. g. for master films, or negative films) has its two sets of lines at 45° and 45° to the film edges, while the multicolor screen for the other type of film (e. g. for reproduced or positive film) has its two sets of lines at 67° and 23° respectively to the film edges, see Figure 2.

This invention is applicable either to contact-printing or to projection-printing, and in the case of projection-printing, the light-rays may be parallel to one another to ensure faithful reproduction.

In multicolor screens of the kind referred to, as the lines of greasy ink are printed from engraved rollers, the multi-color screen has the definite and precise mesh determined by the number of lines (and interspaces) per millimetre. Thus, there may be 15 lines per millimetre.

According to a further feature of this invention, a method of producing cinematograph films in colors is characterized by the employment of a master (e. g. negative) film having lines in the multi-color screen of different mesh from that of the lines on the reproduced (e. g. positive) film, see Figure 3.

The following is a description by way of example of one method of carrying this invention into effect.

A sensitized film embodying a multicolor screen intended for the production of master film (e. g. negative film) is produced by the process described in my copending application hereinbefore mentioned, and the two sets of parallel lines on the film are arranged at right angles to each other and at 45° to the edges of the film. There is a definite number of lines to the inch, say 15 to 20.

A sensitized film embodying a multicolor screen is prepared for the reproduced (e. g. positive) film also by the process described in my copending application hereinbefore mentioned, but in this case the two rows of parallel lines on the film which are at right angles to one another are disposed at 67° and 23° respectively to the film edges. Furthermore, the number of lines to the inch may be different from that in the master film, for example the number of lines might be less than the number on the master film.

I claim:

1. A method of copying a master film associated with a multicolor screen of the geometrical kind comprising straight lines on to a sensitive surface having a multicolor screen of the same kind, in which the angle at which the lines of the multicolor screen associated with the master film intersect the edges of the film is oblique and different from the corresponding angle in the case of the reproduced film.

2. A method of copying a master film associated with a multicolor screen of the geometrical kind comprising straight lines on to a sensitive surface having a multicolor screen of the same kind, in which the lines of each multicolor screen comprise two series at right angles to one another, and intersect the edges of the film at an angle other than 45°, characterized by the fact that in the printing operation the moiré-effect is avoided by arranging the two films with like surfaces in contact.

3. A method of copying a master film associated with a multicolor screen of the geometrical kind comprising straight lines on to a sensitive surface having a multicolor screen of the same kind, in which the lines of each multicolor screen comprise two series at right angles to one another, and intersect the edges of the film at 67° and 23° respectively, characterized by the fact that in the printing operation the moiré effect is avoided by arranging the two films with like surfaces in contact so that the corresponding lines in the two multicolor screens will be at 45° to one another.

4. A method of copying a master film associated with a multicolor screen of the geometrical kind comprising straight lines on to a sensitive surface having a multicolor screen of the same kind, in which the lines of the multicolor screen associated with the master film comprise two series intersecting the edges of the film at 45° and 45° respectively whilst the lines of the multicolor screen associated with the reproduced film comprise two series intersecting the edges of the film at 67° and 23° respectively.

5. A method of copying a master film associated with a multicolor screen of the geometrical kind comprising straight lines on to a sensitive surface having a multicolor screen of the same kind, in which the angle at which the lines of the multicolor screen associated with the master film intersect the edges of the film is oblique and different from the corresponding angle in the case of the reproduced film, and the lines of the multicolor screen associated with the master film are of different mesh from the lines of the multicolor screen associated with the reproduced film.

6. A method of copying a master film associated with a multicolor screen of the geometrical kind comprising straight lines on to a sensitive surface having a multicolor screen of the same kind, in which the angle at which the lines of the multicolor screen associated with the master film intersect the edges of the film is oblique and different from the corresponding angle in the case of the reproduced film, wherein projection printing is employed and parallel light is projected from one film to the other at right angles to the surfaces of the two films.

In testimony whereof I affix my signature.

LOUIS DUFAY.